July 18, 1944. V. E. HOFMANN 2,353,825
APPARATUS FOR MOLDING THERMOPLASTIC MATERIAL
Filed Feb. 11, 1942 7 Sheets-Sheet 2

INVENTOR
V. E. HOFMANN
BY
ATTORNEYS

July 18, 1944.  V. E. HOFMANN  2,353,825
APPARATUS FOR MOLDING THERMOPLASTIC MATERIAL
Filed Feb. 11, 1942   7 Sheets-Sheet 5

INVENTOR
V. E. HOFMANN
BY
ATTORNEYS

July 18, 1944.　　　V. E. HOFMANN　　　2,353,825
APPARATUS FOR MOLDING THERMOPLASTIC MATERIAL
Filed Feb. 11, 1942　　　7 Sheets-Sheet 6

Fig. 8.

INVENTOR
V.E. HOFMANN
BY
ATTORNEYS

Patented July 18, 1944

2,353,825

UNITED STATES PATENT OFFICE 2,353,825

APPARATUS FOR MOLDING THERMO-
PLASTIC MATERIALS

Victor E. Hofmann, Toledo, Ohio, assignor to
Owens-Illinois Glass Company, a corporation
of Ohio Application February 11, 1942, Serial No. 430,384

17 Claims. (Cl. 18—5)

My invention relates to apparatus for molding thermoplastic materials and particularly organic thermoplastics which, when heated, become soft and plastic, permitting molding operations, and then set and harden as they are cooled. The invention as herein disclosed embodies a machine for manufacturing hollow ware such as bottles and jars, from thermoplastic materials. The machine comprises a parison mold or molds and cooperating forming plugs which may be enclosed alternately within the parison mold while charges of molding material are injected into the mold. Blanks or preforms are thus formed, each comprising a neck section and an integral hollow body blank section. After a blank or parison is thus formed the parison mold is opened and the bare parison while supported on the forming plug is transferred to and enclosed within a finishing mold and while still soft and plastic is blown to finished form.

A difficulty which has been experienced in making articles by such a method is due to the fact that heated thermoplastic materials tend to shrink or deform due to the surface tension and other forces present in the material during the molding thereof. When the hot semi-liquid mass is confined in cold molds and permitted to cool and set under pressure, it conforms exactly to the contours of the molds but when the molds are opened while the material is still soft, as has been found necessary in the formation of parisons by the method above referred to, retraction of the softened material on the forming plugs takes place in many instances before it can harden and set. The degree of deformation or retraction along the walls of the forming plug varies with the kind of thermoplastic materials employed. An object of the present invention is to provide a method and means for overcoming the above mentioned difficulty.

A further object of my invention is to provide a novel and improved molding machine which embodies means for transferring the bare parisons from a parison mold to a finishing mold, and means for preventing distortion or retraction of the parisons during the transfer.

Other objects of the invention will appear hereinafter.

The molding machine herein disclosed embodies various features of construction also disclosed in the patent to Moreland et al., Number 2,298,-716, October 13, 1942, Machine for molding thermoplastics.

Referring to the accompanying drawings.

Figure 1:
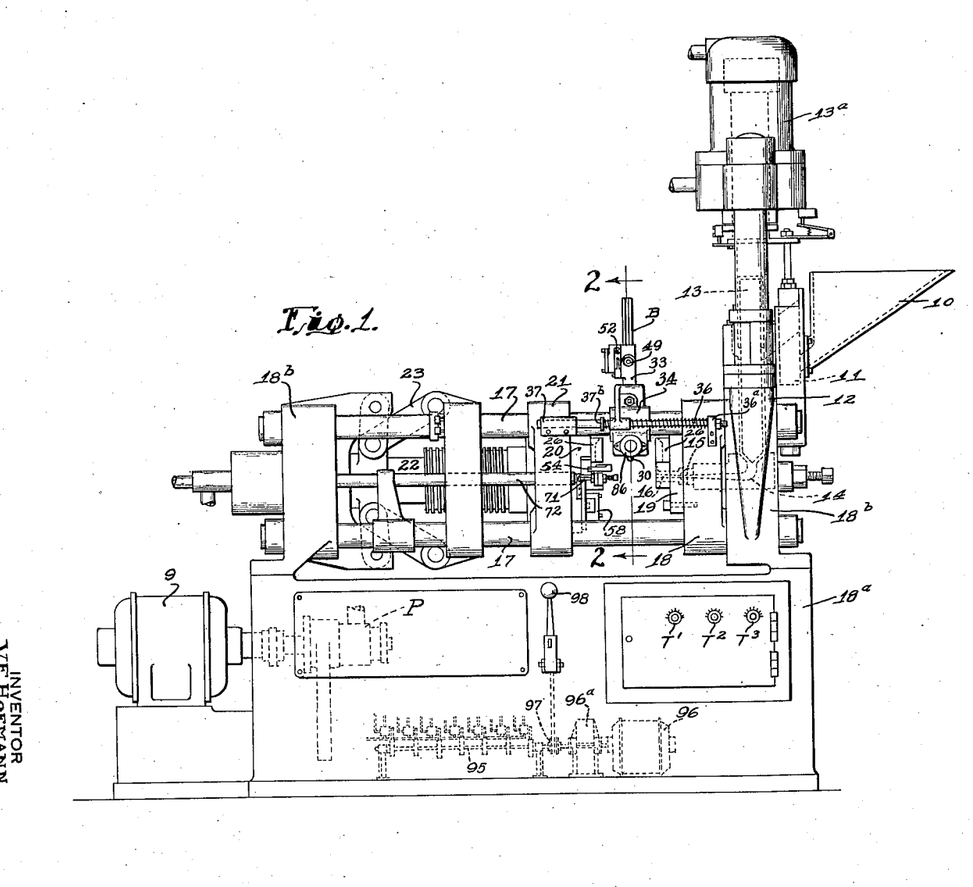
Fig. 1 is an elevation view of a machine for molding hollow containers from thermoplastic material in accordance with my invention.

Referring to Fig. 1, the molding material is fed in granulated or powdered form from a supply hopper 10 to the injection mechanism which includes a feeder plunger 11 operatively connected to an injection plunger 13 and reciprocated therewith for feeding individual charges of the molding material to a heating chamber 12 in which the material is heated and converted to a semifluid or plastic condition. The injection plunger is reciprocated vertically by the piston of a hydraulic motor 13$^a$ and forces the material through the heating chamber and through a passageway 14 to a nozzle 15 and thence through a sprue hole or passageway 16 which communicates with the dies.

The framework of the machine includes a machine base 18$^a$ and four horizontal cylindrical rails 17 mounted in end supports 18$^b$, the latter surmounting and being fixed to the machine base. A bolster plate 18 having a fixed mounting on the rails carries a stationary die plate 19 bolted thereto. A movable die plate 20 is bolted to a bolster plate 21 mounted on the rails 17 for movement toward and from the plate 18. The plate 21 is reciprocated by a hydraulic motor 22 operating through suitable connections including toggle links 23. An electric motor 9 is connected to drive a pump P which supplies oil or other fluid under pressure to the hydraulic system including the hydraulic motors 13$^a$ and 22. An electric timer T' is placed in the main control circuit to limit the length of time the ram 13 remains in its lowered position and a timer T$^2$ operates automatically to open the molds after a predetermined time has elapsed. A timer T³ may be employed when the machine is operated automatically, to determine the length of time the molds remain open and then start the machine in operation. The parts thus far described may be of conventional construction and operation and are not in themselves a part of the present invention.

Mounted on the die plates 19 and 20 (see Fig. 5) are dies or molds including a parison mold 25 and finishing molds 24 and 26. Each mold comprises partible halves or sections attached respectively to the die plates 19 and 20 by means of bolts 27. Each half of the parison mold 25 (see Fig. 4) includes a body mold section 25ᵃ and a neck mold section 25ᵇ made in separate pieces. When the mold halves are brought together, molding material is forced through the sprue hole 16 and thence into the mold cavity through a vertical gate or riser 28 (Fig. 4) formed in the face of the stationary section of the parison mold.

Figure 2:
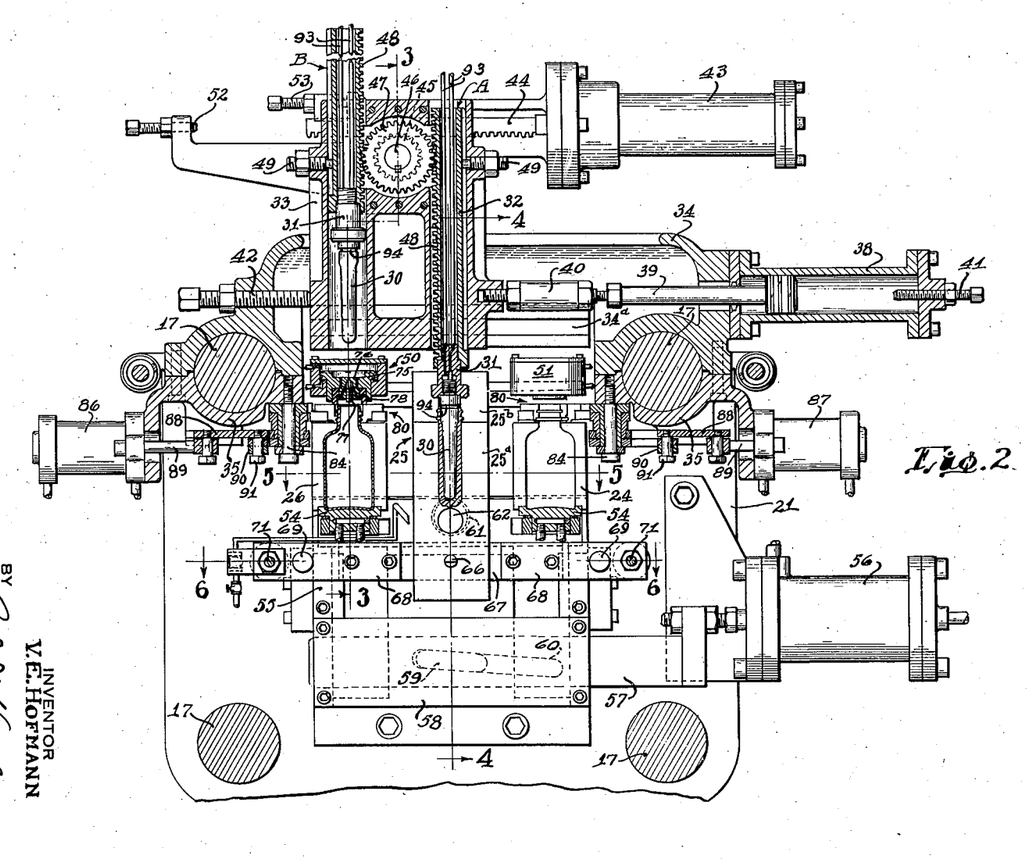
Fig. 2 is a section elevation on a larger scale, the section being taken at the line 2—2 on Fig. 1, but with the molds in closed position.

Referring to Fig. 2, plungers A and B are arranged to cooperate with the molds. Each plunger includes a forming plug 30 removably attached by means of a connector 31 to the lower end of a tubular stem 32. The plungers are mounted for reciprocation vertically in a carriage 33 in the form of a slide block which is mounted for horizontal reciprocating movement in a transverse supporting frame 34 which forms a bridge extending between and slidably mounted on the upper rails 17. Bearing plates 35, which engage the under surfaces of the rails, are bolted to the bridge and retain it in position on the rails. The bridge 34 is formed with guideways 34ᵃ in which the carriage 33 is slidably mounted.

Figure 8:
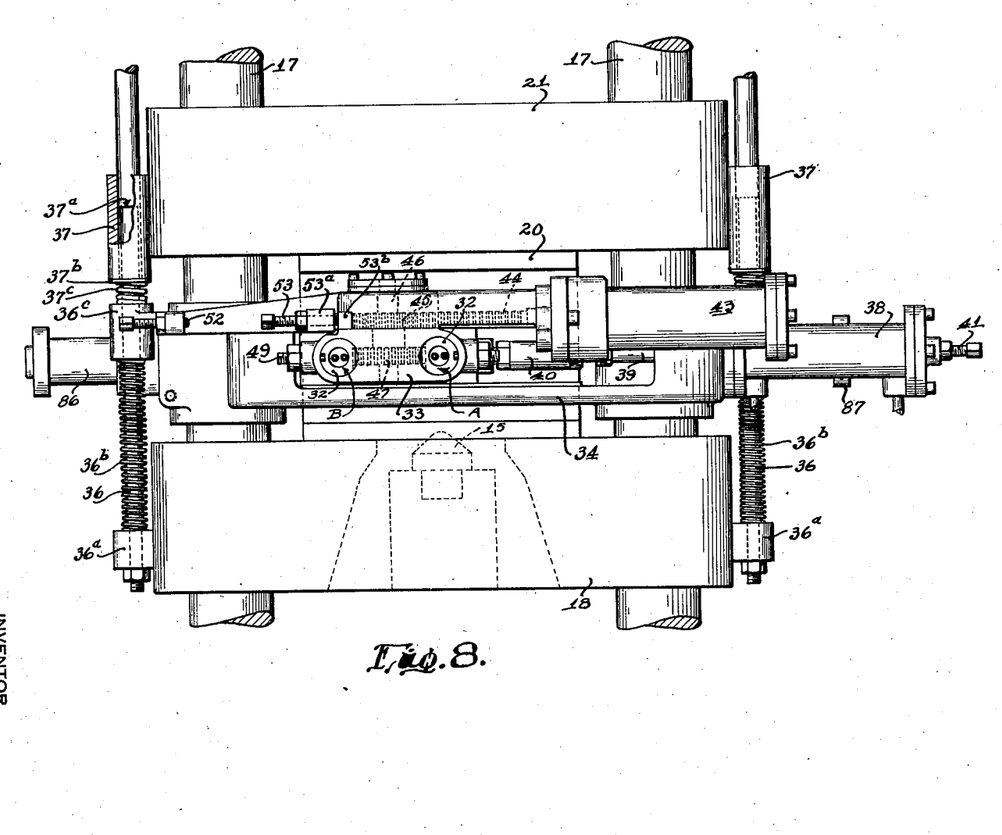
Fig. 8 is a fragmentary plan view of that portion of the machine comprising die plates, plunger carriage and their mountings.

When the motor 22 (Fig. 1) operates to move the bolster plate 21 to the left and thereby opens the molds, the bridge 34 is moved to an intermediate position. The means for controlling the movements of the bridge includes a pair of parallel rods 36 (Figs. 1 and 8) connected to the bolster plate 18 at opposite ends thereof by means of connecting lugs 36ᵃ attached to the bolster plate. Coil springs 36ᵇ mounted on the rods 36 are held under compression between the lugs 36ᵃ and bearing sleeves 36ᶜ which are fixed to the carriage 34 and are slidable on said rods. Bearing sleeves 37 attached to the ends of the bolster plate 21 are also slidable on the rods 36. An annular shoulder 37ᵃ is formed on each rod 36 by reducing the diameter of one section of the rod. Collars 37ᵇ slidable on the rods 36 are interposed between the bearing sleeves 37 and 36ᶜ. Buffer springs 37ᶜ may be interposed between the collars 37ᵇ and sleeves 36ᶜ. When the bolster plate 21 is withdrawn along the rails 17 for opening the molds, the bridge 34 which carries the parison plungers moves with the bolster plate under the force of the compression springs 36ᵇ until the collars 37ᵇ are arrested by the shoulders 37ᵃ. The bolster plate 21 continues its movement until the Fig. 1 position is reached. This leaves the mold sections separated and the bridge 34 with the parison plungers in a position midway between the open mold sections.

The plunger carriage 33 is reciprocated by an air operated piston motor 38 comprising a cylinder bolted to the bridge 34. The piston rod 39 of the motor is attached to the carriage by an adjustable connector 40. An adjustable stop rod 41 in the path of the piston limits the movement of the carriage in one direction. An adjustable stop 42 mounted in the bridge 34 limits the movement in the other direction. The vertical reciprocating movement of the plungers A and B are effected by an air operated piston motor 43 operating through rack and pinion connections including a rack 44 (Figs. 2 and 3) attached to the motor piston rod and running in mesh with a pinion 45 keyed to a shaft 46. The shaft is journalled in the carriage 33 and has keyed thereto a second pinion 47 which meshes with rack teeth 48 formed on the plungers. The plungers are held against rotative movement by guide pins 49 which extend into vertical grooves formed in the plungers.

Reciprocation of the rack bar 44 by the piston motor operates to move the plungers simultaneously but in opposite directions. These movements are synchronized with the horizontal reciprocating movements of the plunger carriage and with the opening and closing movements of the molds, all as hereinafter described, so that the reciprocating movements of the carriage and the vertical reciprocating movements of the plungers take place while the molds are open. As shown in Fig. 2 the plunger A is in its lowered position with the forming plug enclosed within the parison mold 25. With the parts in this position a charge of molding material is injected into the parison mold, thereby forming a parison. At the same time the parison which has been formed on the plunger B by a preceding operation and which has been transferred to the finishing mold 26, it being blown to finished form by air supplied through a blow-head 50 operating as hereinafter described. A second blow-head 51 cooperates with the mold 24 for blowing the parisons which have been formed on the plunger A. A stop 52 adjustable in an arm on the carriage 33 is positioned in the path of the rack 44 to limit the outward stroke of the motor piston and thereby determines the lowered position of the plunger B. A stop bolt 53 (Figs. 2 and 8) is adjustably mounted in a bearing lug 53ᵃ attached to the rack bar 44 with the stop bolt in position to engage a stop lug 53ᵇ on the carriage and thereby limit the movement of the rack 44 in the reverse direction, thus determining the lowered position of the plunger A.

Bottom plates 54 (Figs. 2, 3) for the finishing molds are bolted to a vertically disposed plate or frame 55 mounted for up and down sliding movement on the die plate 20. The means for lifting and lowering the frame 55 and bottom plates 54 includes an air operated piston motor 56 (Fig. 2) mounted on the bolster plate 21. The piston rod of the motor is connected to a horizontal slide bar 57 for reciprocating the latter horizontally in a guideway formed by means of a guide plate 58 (Figs. 2, 4) bolted to the die plate 20. A key 59 attached to the plate 55 engages an inclined slideway 60 formed in the bar 57. As shown in Fig. 2 the mold bottoms 54 are held in their lifted or operative position. When the motor 56 is actuated and moves the bar 57 to the left, the key 59 and with it the carrying frame for the mold bottoms is cammed downward, thereby lowering the mold bottoms.

When the frame 55 is lowered the sprue is severed at the lower end of the parison by the following means. A wedge-shaped cam 61 (Fig. 4) which is attached to the frame 55, engages the inclined end face of a cylindrical slide block 62 which is mounted for limited endwise movement in one section of the parison mold 25.

Figure 4:
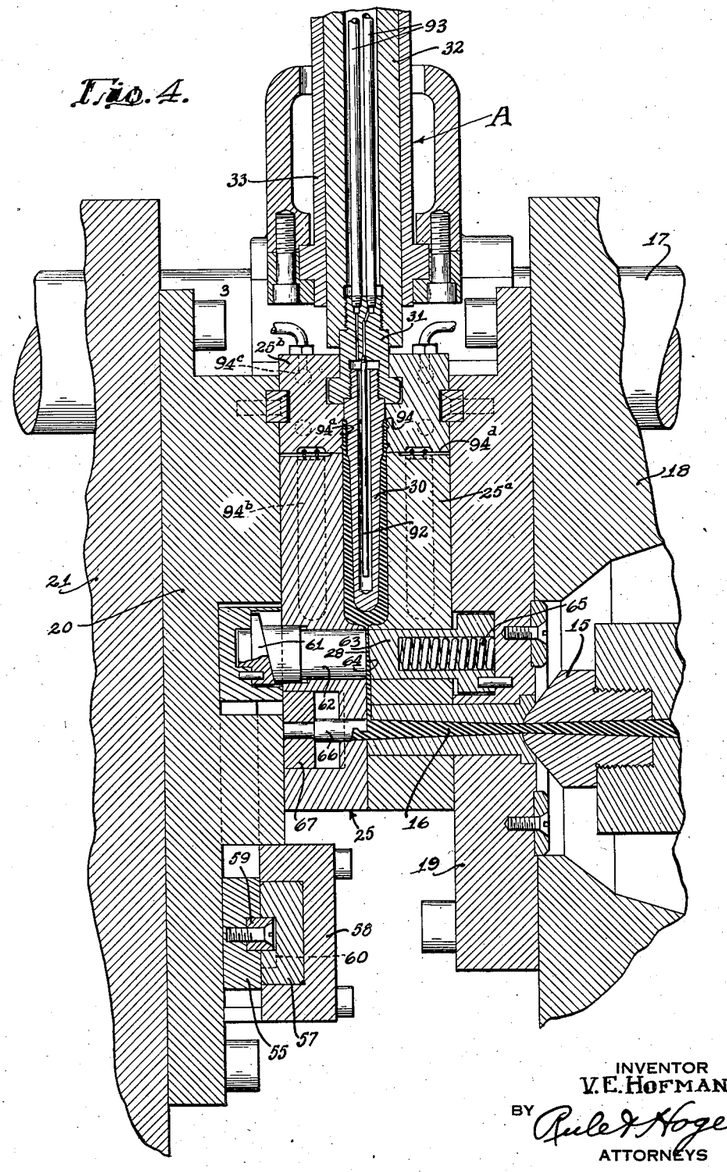
Fig. 4 is a section at the line 4—4 on Fig. 2.
Figure 5:
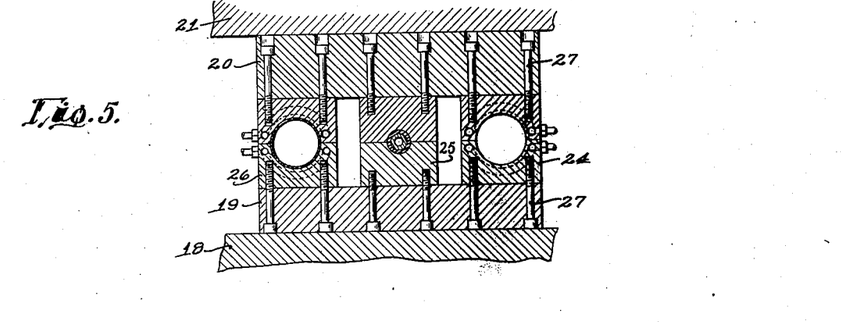
Figs. 5 and 6 are sectional plan views taken at the lines 5—5 and 6—6 respectively on Fig. 2.

When the frame 55 is in its lifted position the outer or forward end of the block 62 is flush with the face of the mold 25 as shown in Fig. 4. A slide block 63 in alignment with the block 62 is mounted for a short lengthwise reciprocating movement, being supported in the die plate 19 and the attached section of the parison mold 25. The outer face of the block 63 abuts the block 62 and is formed in a vertical groove 64 which provides a channel for that portion of the sprue which traverses the plugs 62 and 63.

When the frame 55 is moved downward for lowering the mold bottoms the wedge 61 is carried downward, permitting a coil spring 65, which is housed within the block 63, to move the blocks 63 and 62 to the left (Fig. 4) so that the sprue is severed at the lower end of the parison. The sprue hole 64 leading from the parison downward through the block 63 is tapered, being comparatively narrow at the upper edge of the block. The severing movement is sufficient to completely sever the sprue from the parison but leaves the sprue intact.

Figure 6:
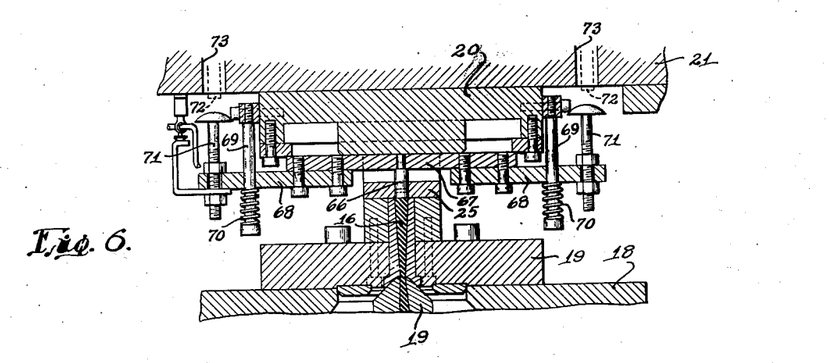

Means for ejecting the sprue when the mold is opened includes a pin 66 (Figs. 4 and 6) which is attached to a horizontal bar 67 and extends outwardly through a section of the mold 25. The outer end of the pin 66 is formed with a hook to engage the sprue. Referring to Fig. 6, plates 68 are bolted to the plate 67 and form extensions thereof. The plates 68 are slidably supported on rods 69 attached to the plate 20. Coil springs 70 hold the bar 67 against the plate 20. Stop bolts 71 adjustably mounted in the plates 68 are in alignment with stationary stops 72 which are adapted to protrude through openings 73 in the pillow block 21 when the mold sections are separated. When the pillow block 21 is withdrawn for opening the mold sections the pin 66 withdraws the sprue from the sprue hole 16, the sprue having been severed from the parison as above described. The stop bolts 71 (Fig. 6) engage the stationary stops 72 during the final outward movement of the pillow block so that the plate 67 is moved away from the die plate 20 and projects the hook end of the pin 66 beyond the face of the mold 25 through which the pin extends. This releases the sprue which has been completely withdrawn from the sprue hole 16 and permits it to drop by gravity.

Figures 3, 3A:
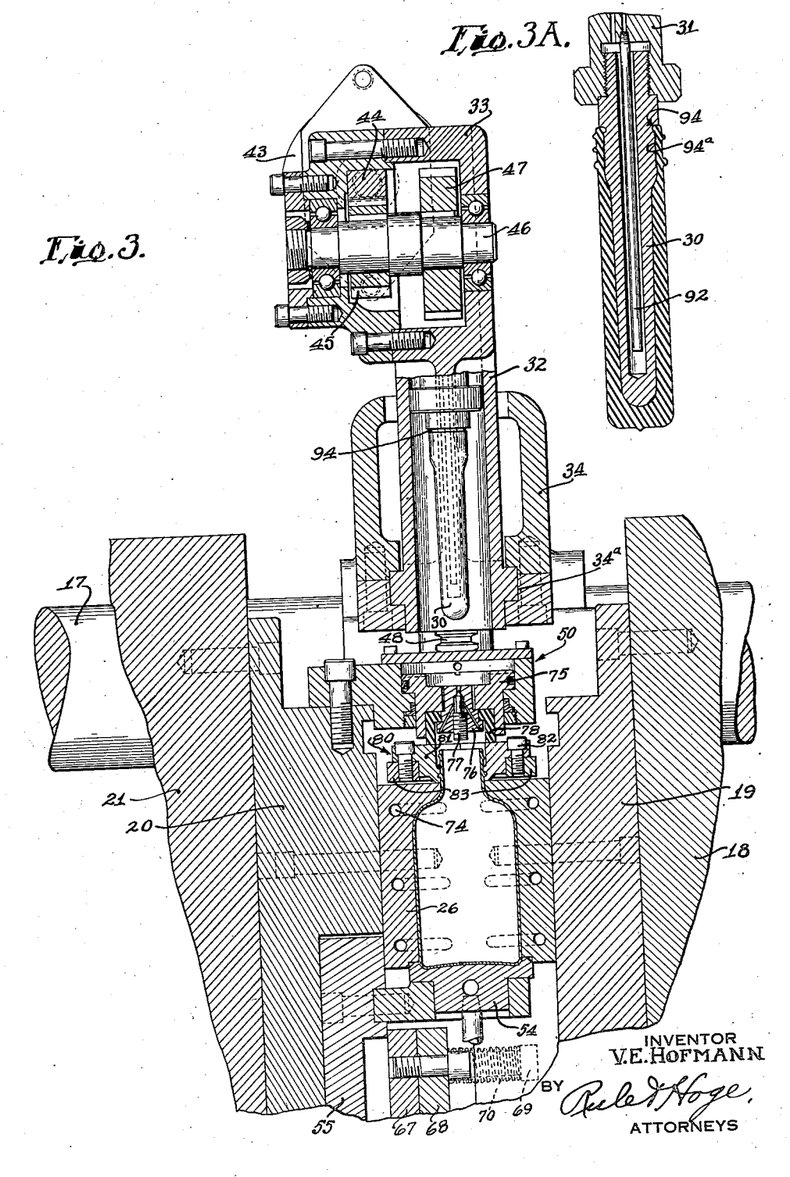
Fig. 3 is a sectional elevation at the lines 3—3 on Fig. 2.
Fig. 3A is a sectional view of a molding plug and a parison thereon.

The blow mold sections may be cooled by the circulation of air or other cooling fluid through passageways 74 (Fig. 3) formed in the mold sections. The mold bottoms may also be cooled in like manner. The parisons are expanded within the finishing molds 24 and 26 by air pressure supplied through the blowing heads 51 and 50 respectively. The two blowing heads may be of the same construction which, as shown in Fig. 3, comprises a piston 75 movable up and down in a pressure chamber formed in the head. A plug 76 mounted in the piston carries a needle valve 77 adjustable therein to regulate the flow of air through the piston to the mold. A sealing gasket 78 of rubber or the like is attached to the piston by the plug 76 and is adapted to seat on a neck ring or clamp 80, presently to be described, which grips the neck of the parison while the latter is enclosed within the finishing mold. The piston 75 is lowered to operative position in the blow-head when air under pressure is admitted above the piston and is lifted when the air pressure above the piston is released, by air pressure continuously maintained on the lower side of the piston flange.

Figure 7:
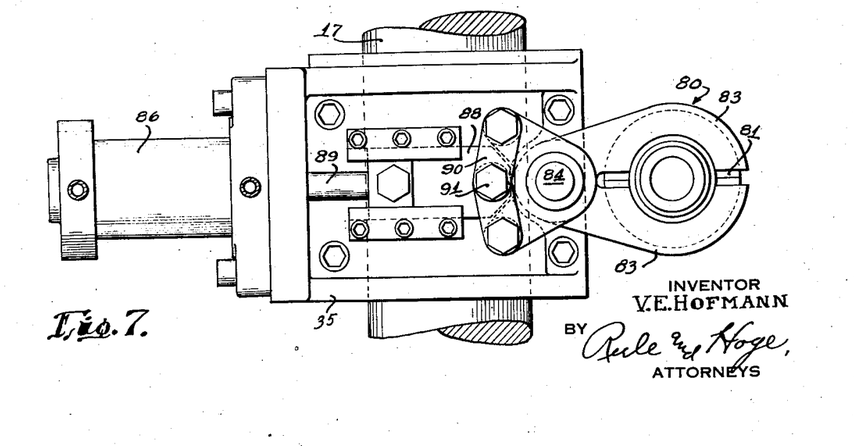
Fig. 7 is a bottom plan view of a neck clamp and its operating means.

Each neck ring or holder 80 (Figs. 2, 3, 7) comprises a split clamping ring 81 which is adapted to close around the neck of the parison, the inner surface of the ring being shaped to conform to the exterior surface of said neck. For example, the ring may be formed with spiral grooves corresponding to threads formed on the neck of the parison. The ring sections are secured by bolts 82 to a pair of jaws 83 which swing on a pivot pin 84. The pivot pins are mounted in the bearing plates 35. Air operated piston motors 86 and 87 are mounted on the bearing plates 35 at the opposite ends respectively of the bridge 34 and are operatively connected to the clamping jaws 80. The connections between each motor piston and the clamping jaws include a slide bar 88 connected to the piston rod 89 (Fig. 7) and connecting the piston rod with a pair of links 90. The links are connected at their inner ends by a pivot 91 to the slide bar and at their outer ends are pivotally connected to the jaws 80.

The parison forming plugs 30 may be cooled by circulation of air or other cooling fluid through the hollow interiors of the plugs. For this purpose tubes 92 (Fig. 4) extending downward within the hollow plugs 30 communicate through passageways extending through the connectors 31, with pipes 93 extending through the stems 32 and through which a cooling fluid is circulated.

In order to prevent displacement or distortion of the neck portion of the parison which is left bare and exposed to the atmosphere during the transfer of the parison from the mold 25 to the finishing mold, and particularly to prevent shortening or retraction of the neck portion along the forming plug 30, the following means and construction are provided. The upper portion of the plug 30 on which the neck of the parison is molded is made comparatively thick (Figs. 3A and 4), the walls of the plug being tapered inwardly adjacent the dividing line between the neck section 25$^b$ and body section 25$^a$ of the mold so that the walls of the body portion of the parison are comparatively thick. With this construction the neck portion of the parison will cool and harden more quickly than the thicker walls of the body portion. The neck of the parison is thus hardened or set to such an extent before the blank mold opens, that the tendency of the bare parison to retract along the forming plug during the parison transfer is greatly reduced. The body portion of the parison with its comparatively thick walls remains sufficiently soft and plastic to permit it to be blown and expanded to finished form after it is enclosed in the finishing mold. As an additional means to facilitate the transfer of the parison and to prevent its shrinking or shortening, the plug 30 may be formed with an annular groove 94 (Fig. 3A) or the like at the rim of the parison. This permits the molding material which is pressed into the groove to grip the plug in such manner that the neck of the parison will be held in position. The neck forming portion of the plug may also have a rough or ribbed surface 94$^a$ to assist in holding the parison while the body portion presents a smooth and polished surface which gives a smooth interior finished surface to the parison. A further method of controlling the temperature of the parison consists in providing means such as electric cartridge heaters 94$^b$ placed in pockets within the body portion of the parison mold for regulating and maintaining the required temperature of the molding material while the neck mold portion is at a lower temperature. The temperature of the neck molds may be regulated and controlled by circulating cold water or other temperature regulating fluid through conduits 94$^c$ formed in the neck molds.

An air gap 94$^d$ or other form of insulation may be provided between the neck section 25$^b$ and body section 25$^a$ of the parison mold to reduce the amount of heat transfer between these parts. When an air gap is used, contact is preferably had between said sections only at a narrow area adjoining and surrounding the periphery of the parison. In this manner the body of the parison mold may be held at a temperature of approximately 200 to 275° F. or even higher, the desired temperature being dependent upon the particular molding material which is in use, while the neck mold sections may be held at a much lower temperature such as is required to cool and set the neck portion of the parison with sufficient rigidity to hold it in position on the plug during the transfer to the finishing mold. The depth of the groove 94 for forming the holding bead at the rim of the parison, while sufficient to hold the parison during the transfer, is sufficiently shallow and suitably shaped to permit the plug 30 to be withdrawn from the parison after the latter is gripped within the clamping ring 80, without unduly stretching or disrupting the parison. The permissible depth of the groove is dependent upon the elasticity of the cold material. This depth may be of the order of 2.5% of the diameter of the parison, assuming that a 5% permissible elongation of the material is permitted without danger of fracture. These dimensions, however, are merely given by way of example and may be varied to adapt the structure to the particular molding material in use.

Figure 9:
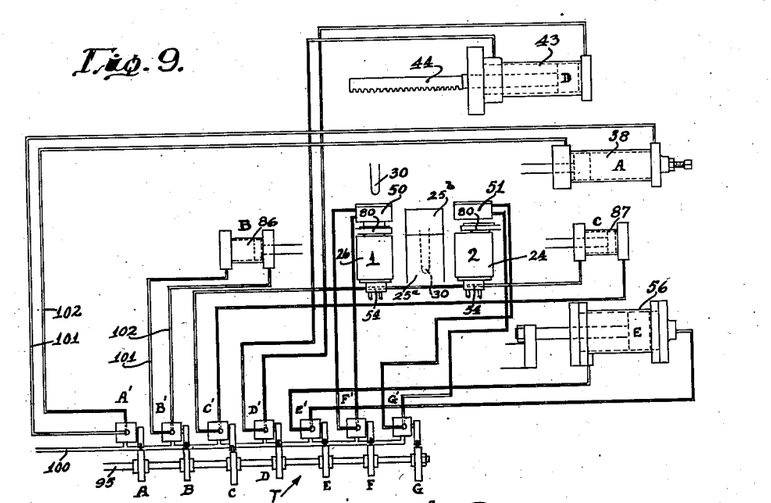
Fig. 9 is a diagram of the pneumatic system and timer mechanism.
Figures 10, 11:
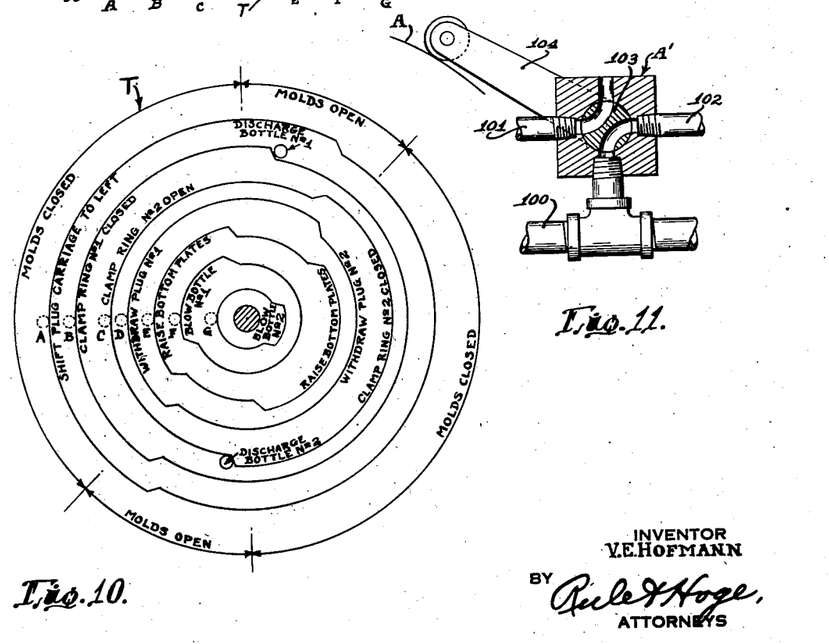
Fig. 10 is a timer cam chart.
Fig. 11 is a detail view of a reversing valve.

A control system for the air operated motors and the blowing heads, as illustrated diagrammatically in Figs. 9 and 10, includes a timer device T and valves controlled thereby. The timer mechanism includes a series of reversing valves designated A' to G' inclusive individual to the various piston motors and blowing heads. These valves are actuated by cams A to G inclusive, mounted on a timer shaft 95 which may be rotated either continuously or intermittently by an electric motor 96 (Fig. 1). The motor may have driving connection with the shaft 95 through speed reduction gearing within a gear box 96$^a$ and a clutch 97 operated by a hand lever 98. If desired, an automatic clutch may be used which is thrown in by the hand lever and automatically disconnects the timer shaft at the completion of one revolution. Air under pressure is supplied through a pressure line 100 (Figs. 9 and 11) leading to the several reversing valves. Pipes 101 and 102 lead from the valve A' to the opposite ends of the piston motor 38 by which the plunger carriage is reciprocated. The valve A', which may be of conventional construction, includes a valve member 103 carrying a rock arm 104 having a cam follower roll which runs on the cam A. Rotation of the latter rocks the valve member 103 for connecting the pipes 101 and 102 alternatively to the pressure line 100.

*Operation*

The sequence of the various operations will be understood by reference to the cam chart (Fig. 10) and diagram (Fig. 9). Figs. 2, 9 and 10 indicate the parts in the same relative positions. The molds at this time are in closed position. The clamping ring over the mold 24 is held open by the motor 87 under control of the cam C and valve C'. The plunger carriage has been shifted to the left by its motor 38. The clamping ring 80 over the mold 26 is closed and the plunger B withdrawn. The bottom plates 54 are in their lifted position. Air pressure is being supplied through the blow-head 50 under the control of the timer cam F for blowing the bottle in the mold 26.

As the timer shaft rotates the cams operate the reversing valves in the following order. The cam F first operates to reverse the valve F'' and cut off the blowing air from the mold 26 and lift the blow-head. The cam E next reverses the valve E' to reverse the motor 56 and cause it to lower the bottom plates. The molds are next opened. The cam B then operates, reversing the motor 86 and opening the clamping ring 80 to release the finished bottle between the open mold sections 26, thereby permitting the bottle to be discharged or removed from the machine. The cam A next operates to reverse the motor 38 and shift the plunger carriage to the right, thus bringing the parison which has just been formed within the mold 25 into position between the open sections of the finishing mold 24. The cam C next operates to effect a reversal of the motor 87, thereby closing the neck clamp 80 about the neck of the parison. The valve D' is next operated by its cam D, causing the motor 43 to lower the plunger B, bringing its plug 30 into position between the open sections of the parison mold and at the same time lifting the plunger A, and withdrawing it from the parison. The molds are then closed.

Following this the valve E' is again reversed, causing the motor 56 to lift the mold bottoms 54. The valve G' is then reversed and lowers the blow-head 51 and blows the parison within the mold 24. Following this the bottom plates are lowered and the molds open and discharge the finished bottle from the mold 24. Thereafter the cams A, B, D, E and F operate their respective valves to bring the parts back to the positions shown in Figs. 2, 9 and 10, the molds also being closed, thereby completing the cycle of operations.

Modifications may be resorted to within the spirit and scope of my invention.

I claim:

1. An injection molding machine comprising in combination a parison mold, finishing molds positioned at opposite sides of the parison mold, each of said molds comprising partible sections, means for opening and closing the molds, a plunger carriage, plungers each including a molding plug, said plungers being mounted on the carriage for reciprocating movement by which the forming plugs are moved into and out of positions between the mold sections for enclosure by the molds, interconnected mechanism by which each plunger is projected into a said position when the other plunger is withdrawn, a motor connected to reciprocate the plungers, means for reciprocating said carriage and bringing each plug alternately into register with the parison mold and a finishing mold, with each plug in register with the parison mold while the other plug is in register with a finishing mold, means for closing the molds about the plugs, means for introducing molding material into the parison mold for forming parisons therein, and means separate from the molding plugs for blowing the parisons in the finishing mold after the molding plug is withdrawn.

2. An injection molding machine comprising a parison mold, finishing molds positioned at opposite sides of the parison mold, each said mold comprising partible sections, die plates on which said sections have a fixed mounting, each die plate having one section of each mold mounted thereon, means for moving the die plates toward and from each other and thereby closing and opening the molds, a plunger carriage mounted over the molds, plungers carried thereby, means for reciprocating said carriage and bringing the plungers alternately over and in register with the parison mold, said plungers being mounted for vertical reciprocating movement into and out of positions to be enclosed within the molds when the latter are closed, means interconnecting the plungers and causing each plunger to be lowered when the other is lifted, and means for reciprocating the plungers.

3. An injection molding machine comprising a parison mold, finishing molds positioned at opposite sides of the parison mold, each said mold comprising partible sections, die plates on which said sections are mounted, means for moving the die plates toward and from each other and thereby closing and opening the molds, a plunger carriage mounted over the molds, plungers carried thereby, means for reciprocating said carriage and bringing the plungers alternately over and in register with the parison mold, and means for reciprocating the plungers vertically and thereby moving them into and out of position to be enclosed within the molds, said means for reciprocating the plungers comprising vertical racks connected to the plungers, a pinion between and meshing with said racks, a piston motor, and means providing operating connections between the motor and pinion for rotating the pinion.

4. An injection molding machine comprising parallel die plates, sectional molds, each comprising mold sections mounted respectively on said plates and having vertical meeting faces, the meeting faces of all the molds sections being in the same vertical plane when the molds are closed, means for relatively moving said die plates toward and from each other for closing and opening the molds, said molds including a parison mold and a finishing mold, a plunger carriage, plungers thereon, each including a parison forming plug, means for reciprocating the carriage and thereby moving the plugs alternately into a position above and in register with the parison mold, a motor, interconnected gearing between the plungers and motor for moving the plugs up and down on the carriage into and out of the parison mold and causing each plug to be lowered into position between the sections of the finishing mold as the other plug is moved upward, means for injecting molding material into the parison mold and forming parison, means for holding bare parisons on said plugs and causing them to be transferred with the plugs from the parison mold to a finishing mold, and means for blowing the parisons in the finishing mold.

5. An injection molding machine comprising a framework including horizontally spaced parallel bars, bolster plates extending transversely of said bars, one of said plates being mounted for reciprocating movement lengthwise of the bars, die plates mounted on said bolster plates, sectional molds each comprising partible sections mounted respectively on the die plates, said molds having vertical meeting faces, the meeting faces of all the molds being in the same vertical plane when the molds are closed, means for moving one said bolster plate toward and from the other for closing and opening the molds, a bridge mounted on and extending between said bars, a plunger carriage mounted on the bridge, plungers on said carriage, means for reciprocating said carriage transversely in a direction parallel with the meeting faces of the molds, and means to reciprocating the plungers vertically into and out of operative positions between the molds, said last mentioned means comprising a motor and driving mechanism interconnecting the motor and plungers for lowering each plunger as the other is lifted.

6. An injection molding machine comprising a framework including horizontally spaced parallel bars, bolster plates extending transversely of said bars, one of said plates being mounted for reciprocating movement lengthwise of the bars, die plates mounted on said bolster plates, sectional molds each comprising partible sections mounted respectively on the die plates, said molds having vertical meeting faces, the meeting faces of all the molds being in the same vertical plane when the molds are closed, means for moving one said bolster plate toward and from the other for closing and opening the molds, said molds including a parison mold and finishing molds on opposite sides thereof, a bridge mounted on said rails, a carriage mounted on said bridge, means for reciprocating the carriage transversely, plungers on the carriage, each including a parison forming plug, said plungers arranged to be brought alternately over and in register with the parison mold when the carriage is reciprocated, means for reciprocating the plungers vertically and thereby projecting them alternatively into position to be enclosed in the parison mold, means for injecting molding material into the parison mold and thereby forming the parison on the enclosed plug, means for holding the parison in position on the plug when the parison mold is opened and causing it to be transferred to a finishing mold when the carriage is reciprocated, means for gripping the parison while in register with a finishing mold, permitting the plug to be withdrawn therefrom, and blow heads separate from said plugs for blowing the parisons to finished form within the finishing molds, each blow head being mounted for movement into register with a finishing mold and the parison therein after the plug has been withdrawn.

7. An injection molding machine comprising a parison mold and finishing molds positioned at opposite sides thereof, said molds each comprising partible sections, means for moving the mold sections to and from each other for closing and opening the molds, parison forming plugs, a carriage positioned over the molds and on which said plugs are mounted, means for reciprocating the carriage and bringing the plugs alternately into vertical alignment with the parison mold, each plug being positioned in line with a finishing mold while the other plug is in alignment with the parison mold, means for reciprocating the plugs vertically and thereby lowering the plugs alternately between the open sections of the parison mold, means for injecting molding material into the parison mold and forming a parison on the enclosed plug, means for retaining the parison on the plug when the parison mold is opened and causing the parison to be transferred to a finishing mold when the said carriage is reciprocated, blow-heads individual to the finishing molds, means for gripping a parison when positioned between the sections of a finishing mold and holding it in position while the plug is withdrawn, and means for seating the blowing head on the finishing mold and blowing the parison to finished form within the finishing mold.

8. The combination of a parison mold comprising partible sections, a forming plug, means for closing the mold around said plug, the plug and the mold sections being formed to provide a mold cavity shaped to form a hollow parison having an open neck end portion and a hollow body portion integral therewith, the neck forming portion of the plug being of sufficiently greater diameter than the body forming portion thereof to reduce the thickness of the said neck portion of the parison to such an extent that the side walls of the body portion of the parison are at least substantially double the thickness of the neck portion, means for injecting a thermoplastic molding material into the mold cavity for forming the parison, means for causing the said neck of the parison while enclosed in the parison mold to cool and harden while the body portion remains comparatively soft and plastic, means for opening the parison mold leaving the parison bare and supported solely by the forming surfaces of the forming plug, means for transferring the plug with the bare parison thereon to the finishing mold, a finishing mold, means for enclosing said body portion of the parison in the finishing mold, and means for blowing it to finished form therein.

9. The combination of a parison mold comprising partible sections, a forming plug, means for closing the mold around said plug, the plug and the mold sections being formed to provide a mold cavity shaped to form a hollow parison having an open neck end portion and a hollow body portion integral therewith, the neck forming portion of the plug being of sufficiently greater diameter than the body forming portion thereof to reduced the thickness of the said neck portion of the parison to such an extent that the side walls of the body portion of the parison are at least substantially double the thickness of the neck portion, means for injecting a thermoplastic molding material into the mold cavity for forming the parison, means for causing the said neck of the parison to cool and harden while the body portion remains comparatively soft and plastic, a finishing mold, means for transferring the parison while supported on the forming plug to the finishing mold, means for gripping said neck portion after said transfer, means for withdrawing the plug, and means for blowing the parison within the finishing mold after the plug has been withdrawn.

10. A molding machine comprising a sectional parison mold, a forming plug, means for bringing the mold sections together and enclosing said plug, said plug and mold being shaped to provide a mold cavity for forming a hollow parison having an open neck end portion and a body portion, said cavity being shaped to mold the walls of said neck end portion to a thickness of not more than about half that of the walls of the body portion, means for opening the mold and leaving the bare parison supported on the forming plug, said plug being formed with an annular recess positioned to form the rim of the parison neck and thereby hold the parison in position on the plug when the mold is opened, a finishing mold, means for transferring the parison while supported on the plug to the finishing mold, means for thereafter withdrawing the plug from the parison, and means for blowing the parison in the finishing mold.

11. A molding machine comprising a sectional parison mold, a forming plug, means for bringing the mold sections together and enclosing said plug, said plug and mold being shaped to provide a mold cavity for forming a hollow parison having an open neck end portion and a body portion, said cavity being shaped to mold the walls of said neck end portion to a thickness of not more than about half that of the walls of the body portion, means for opening the mold and leaving the bare parison supported on the forming plug, said plug being formed with an annular recess positioned to form the rim of the parison neck and thereby hold the parison in position on the plug when the mold is opened, a finishing mold, means for transferring the parison while supported on the plug to the finishing mold, means for thereafter withdrawing the plug from the parison, and means for blowing the parison in the finishing mold, said neck forming portion of the plug having a roughened molding surface providing means for causing the bare parison to adhere to the plug after the parison mold has been opened, the body forming portion of the plug having a smooth surface.

12. A molding machine comprising a sectional parison mold, a forming plug, means for bringing the mold sections together and enclosing said plug, said plug and mold being shaped to provide a mold cavity for forming a hollow parison having an open neck end portion and a body portion, said cavity being shaped to mold the walls of said neck end portion to a thickness of not more than about half that of the walls of the body portion, means for opening the mold and leaving the bare parison supported on the forming plug, said plug being formed with an annular recess positioned to form the rim of the parison neck and thereby hold the parison in position on the plug when the mold is opened, finishing mold, means for transferring the parison while supported on the plug to the finishing mold, means for thereafter withdrawing the plug from the parison, means for blowing the parison in the finishing mold, and temperature regulating means for causing the neck portion of the parison to be cooled and set while enclosed in the parison mold and for maintaining the body portion of the parison at a higher temperature and in a plastic condition until introduced into the finishing mold, permitting it to be blown to a finished form within the finishing mold.

13. An injection molding machine comprising parallel die plates, a sectional parison mold, a sectional finishing mold, each said mold comprising sections mounted respectively on said plates and having vertical meeting faces, the meeting faces of all the mold sections being in the same vertical plane when the molds are closed, means for relatively moving the die plates toward and from each other for closing and opening the molds, a plunger carriage, plungers thereon each including a parison forming plug, means for reciprocating the carriage and thereby moving the plugs alternately into a position above and in register with the parison mold, means for moving each plunger up and down on the carriage while its plug is in said position of register with the parison mold and thereby moving the plug into and out of the mold, means for injecting molding material into the parison mold and forming parisons, means for holding the bare parisons on the plugs and causing them to be transferred with the plugs from the parison mold to a finishing mold, a split clamping ring, means for closing said ring about the neck portion of the parison when the latter has been transferred to the finishing mold and thereby holding the parison while the plug is withdrawn therefrom, and means for blowing the parisons in the finishing mold while held by said clamping ring after the plug is withdrawn.

14. An injection molding machine comprising a framework including horizontally spaced parallel bars, bolster plates extending transversely of said bars, one of said plates being mounted for reciprocating movement lengthwise of the bars, die plates mounted on said bolster plates, sectional molds each comprising partible sections mounted respectively on the die plates, said molds having vertical meeting faces, the meeting faces of all the molds being in the same vertical plane when the molds are closed, means for moving one said bolster plate toward and from the other for closing and opening the molds, said molds including a parison mold and finishing molds on opposite sides thereof, a bridge mounted on said rails, a carriage mounted on said bridge, means for reciprocating the carriage transversely, plungers on the carriage, each including a parison forming plug, said plungers arranged to be brought alternately over and in register with the parison mold when the carriage is reciprocated, means for reciprocating the plungers vertically and thereby projecting them alternatively into position to be enclosed in the parison mold, means for injecting molding material into the parison mold and thereby forming the parison on the enclosed plug, means for holding the parison in position on the plug when the parison mold is opened and causing it to be transferred to a finishing mold when the carriage is reciprocated, split clamping rings individual to the finishing molds, means for closing each clamping ring about a parison while the latter is in register with a finishing mold and holding the parison while the forming plug is withdrawn therefrom, and means separate from the forming plug for blowing the parison to finished form within the finishing mold after the plug has been withdrawn.

15. An injection molding machine comprising die plates, sectional molds each comprising partible sections mounted respectively on the die plates, means for relatively moving the die plates toward and from each other for opening and closing the molds, said molds including a parison mold and a finishing mold, a forming plug, means for moving said plug from one mold to the other and for holding it in position to be enclosed by the parison mold when the latter is closed, means for injecting a molding material into the parison mold and causing a parison to be molded about said plug, a split clamping ring positioned over the finishing mold, means for closing said ring about the neck portion of the parison, means for withdrawing the plug from the parison while the latter is held by the clamping ring, and means separate from said plug for blowing the parison to finished form within the finishing mold after the plug has been withdrawn.

16. An injection molding machine comprising die plates, sectional molds each comprising partible sections mounted respectively on the die plates, means for relatively moving the die plates toward and from each other for opening and closing the molds, said molds including a parison mold and a finishing mold, a forming plug, a carriage on which the plug is mounted for up and down movement, means for reciprocating the carriage and thereby bringing plug alternately into register with the parison mold and finishing mold, means for moving the plug up and down while the molds are open into and out of positions between the mold sections and for holding it in position to be enclosed by the parison mold when the latter is closed, means for injecting molding material into the parison mold while the plug is enclosed therein and thereby forming a parison, said plug including means for holding the bare parison thereon during transfer from the parison mold to the finishing mold, a blowing head mounted for movement with one of said die plates into register with the finishing mold when the latter is closed, and means for supplying air through said blowing head and blowing the parison to finished form within parison mold after the said plug has been withdrawn.

17. An injection molding machine comprising die plates, sectional molds each comprising partible sections mounted respectively on the die plates, means for relatively moving the die plates toward and from each other for opening and closing the molds, said molds including a parison mold and a finishing mold, a forming plug, a carriage on which the plug is mounted for up and down movement, means for reciprocating the carriage and thereby bringing plug alternately into register with the parison mold and finishing mold, means for moving the plug up and down while the molds are open, into and out of positions between the mold sections and for holding it in position to be enclosed by the parison mold when the latter is closed, means for injecting molding material into the parison mold while the plug is enclosed therein and thereby forming a parison, said plug including means for holding the bare parison thereon during transfer from the parison mold to the finishing mold, a split clamping ring, means for closing said ring about the neck portion of a parison when the latter has been carried by the molding plug to a position between the finishing mold sections and thereby holding the parison while the plug is withdrawn, and a blowing head mounted separately from said carriage in position to register with the closed finishing mold and the parison therein, and means for supplying air through said blowing head and blowing the parison in the finishing mold after the molding plug has been withdrawn.

VICTOR E. HOFMANN.